United States Patent
Ting et al.

(10) Patent No.: US 7,950,021 B2
(45) Date of Patent: May 24, 2011

(54) METHODS AND SYSTEMS FOR PROVIDING RESPONSES TO SOFTWARE COMMANDS

(75) Inventors: David M. T. Ting, Sudbury, MA (US); Charles Kekeh, Melrose, MA (US)

(73) Assignee: Imprivata, Inc., Lexington, MA (US)

( * ) Notice: Subject to any disclaimer, the term of this patent is extended or adjusted under 35 U.S.C. 154(b) by 1226 days.

(21) Appl. No.: 11/392,233

(22) Filed: Mar. 29, 2006

(65) Prior Publication Data

US 2007/0240055 A1    Oct. 11, 2007

(51) Int. Cl.
*G06F 3/00* (2006.01)
(52) U.S. Cl. ........................................... 719/320
(58) Field of Classification Search ............... None
See application file for complete search history.

(56) References Cited

U.S. PATENT DOCUMENTS

| | | | |
|---|---|---|---|
| 4,993,068 A | 2/1991 | Piosenka et al. | 713/186 |
| 5,263,165 A | 11/1993 | Janis | 711/163 |
| 5,499,297 A | 3/1996 | Boebert | 380/23 |
| 5,719,950 A | 2/1998 | Osten et al. | 382/115 |
| 5,721,906 A | 2/1998 | Siefert | 395/609 |
| 5,721,914 A | 2/1998 | DeVries | 395/615 |
| 5,724,575 A | 3/1998 | Hoover et al. | 395/610 |
| 5,761,662 A | 6/1998 | Dasan | 707/10 |
| 5,768,577 A | 6/1998 | Kleewein et al. | 395/610 |
| 5,802,199 A | 9/1998 | Pare et al. | 382/115 |
| 5,841,888 A | 11/1998 | Setlak et al. | 382/124 |
| 5,857,028 A | 1/1999 | Frieling | 382/116 |
| 5,857,188 A | 1/1999 | Douglas | 707/9 |
| 5,892,838 A | 4/1999 | Brady | 382/115 |
| 5,917,928 A | 6/1999 | Shpuntov et al. | 382/124 |
| 5,930,804 A | 7/1999 | Yu et al. | 707/104 |
| 5,937,405 A | 8/1999 | Campbell | 707/10 |
| 5,963,945 A | 10/1999 | Pal | 707/10 |
| 5,966,705 A | 10/1999 | Koneru et al. | 707/9 |
| 5,977,964 A | 11/1999 | Williams et al. | 345/327 |
| 5,982,913 A | 11/1999 | Brumbley et al. | 382/124 |
| 5,982,914 A | 11/1999 | Lee et al. | 382/124 |
| 5,991,408 A | 11/1999 | Pearson et al. | 713/186 |
| 5,991,429 A | 11/1999 | Coffin et al. | 382/118 |
| 5,999,637 A | 12/1999 | Toyoda et al. | 382/124 |
| 6,000,033 A | 12/1999 | Kelley et al. | 726/8 |
| 6,016,476 A | 1/2000 | Maes et al. | 705/1 |
| 6,018,739 A | 1/2000 | McCoy et al. | 707/102 |
| 6,021,211 A | 2/2000 | Setlak et al. | 382/124 |

(Continued)

FOREIGN PATENT DOCUMENTS

WO    98/16906    4/1998

(Continued)

OTHER PUBLICATIONS

Ankari Inc. Promotional Material, pp. 1-2, "Trinity Enterprise Authentication," (2001); pp. 3-4 "Trinity—The Heart of the Solution" downloaded from http://www.itsecuritymall.com/desc/trinity.htm.

(Continued)

*Primary Examiner* — Hyung S Sough
*Assistant Examiner* — Carina Yun
(74) *Attorney, Agent, or Firm* — Bingham McCuthen LLP (57) ABSTRACT

Software processes are automated by storing predetermined responses and recognizing the screens of server and/or web-based applications that require data to continue operating.

19 Claims, 4 Drawing Sheets

U.S. PATENT DOCUMENTS

| | | | | |
|---|---|---|---|---|
| 6,023,723 | A | 2/2000 | McCormick et al. | 709/206 |
| 6,041,411 | A | 3/2000 | Wyatt | 713/200 |
| 6,047,281 | A | 4/2000 | Wilson et al. | 707/3 |
| 6,047,282 | A | 4/2000 | Wilson et al. | 707/3 |
| 6,052,730 | A | 4/2000 | Felciano et al. | 709/225 |
| 6,061,790 | A | 5/2000 | Bodnar | 713/171 |
| 6,070,159 | A | 5/2000 | Wilson et al. | 707/3 |
| 6,076,167 | A | 6/2000 | Borza | 713/201 |
| 6,144,959 | A | 11/2000 | Anderson et al. | 707/9 |
| 6,144,962 | A | 11/2000 | Weinberg et al. | 707/10 |
| 6,148,307 | A | 11/2000 | Burdick et al. | 707/104 |
| 6,151,602 | A | 11/2000 | Hejlsberg et al. | 707/10 |
| 6,151,643 | A | 11/2000 | Cheng et al. | 710/36 |
| 6,160,903 | A | 12/2000 | Hamid et al. | 382/115 |
| 6,167,517 | A | 12/2000 | Gilchrist et al. | 713/186 |
| 6,181,807 | B1 | 1/2001 | Setlak et al. | 382/124 |
| 6,182,076 | B1 | 1/2001 | Yu et al. | 707/10 |
| 6,185,316 | B1 | 2/2001 | Buffam | 382/115 |
| 6,195,654 | B1 | 2/2001 | Wachtel | 707/3 |
| 6,202,159 | B1 | 3/2001 | Ghafir et al. | 713/201 |
| 6,208,746 | B1 | 3/2001 | Musgrave | 382/100 |
| 6,212,290 | B1 | 4/2001 | Gagne et al. | 382/125 |
| 6,237,006 | B1 | 5/2001 | Weinberg et al. | 707/103 |
| 6,256,737 | B1 | 7/2001 | Bianco et al. | 713/186 |
| 6,289,111 | B1 | 9/2001 | Takhar | 382/115 |
| 6,289,462 | B1 | 9/2001 | McNabb et al. | 726/21 |
| 6,292,795 | B1 | 9/2001 | Peters et al. | 707/3 |
| 6,301,376 | B1 | 10/2001 | Draganoff | 382/124 |
| 6,311,272 | B1 | 10/2001 | Gressel | 713/186 |
| 6,327,652 | B1 | 12/2001 | England et al. | 713/2 |
| 6,334,124 | B1 | 12/2001 | Bouchard et al. | 707/3 |
| 6,336,114 | B1 | 1/2002 | Garrison | 707/9 |
| 6,338,066 | B1 | 1/2002 | Martin et al. | 707/3 |
| 6,393,424 | B1 | 5/2002 | Hallman et al. | 707/10 |
| 6,460,141 | B1 | 10/2002 | Olden | 713/201 |
| 6,466,941 | B1 | 10/2002 | Rowe et al. | 707/102 |
| 6,496,595 | B1 | 12/2002 | Puchek et al. | 382/124 |
| 6,498,861 | B1 | 12/2002 | Hamid et al. | 382/124 |
| 6,526,443 | B1 | 2/2003 | Goldsmith et al. | 709/224 |
| 6,826,696 | B1 | 11/2004 | Chawla et al. | 713/201 |
| 6,829,712 | B1 | 12/2004 | Madoukh | 713/200 |
| 6,851,051 | B1 | 2/2005 | Bolle et al. | 713/186 |
| 6,859,878 | B1 | 2/2005 | Kerr et al. | 713/183 |
| 6,883,098 | B1 | 4/2005 | Roman et al. | 713/200 |
| 2001/0000045 | A1 | 3/2001 | Yu et al. | 707/9 |
| 2001/0011349 | A1 | 8/2001 | Garrison | 713/165 |
| 2001/0025342 | A1 | 9/2001 | Uchida | 713/186 |
| 2001/0036299 | A1 | 11/2001 | Senior | 382/124 |
| 2001/0037407 | A1 | 11/2001 | Dragulev et al. | 709/250 |
| 2001/0049687 | A1 | 12/2001 | Russell | 707/104 |
| 2002/0004839 | A1 | 1/2002 | Wine et al. | 709/231 |
| 2002/0012432 | A1 | 1/2002 | England et al. | 380/231 |
| 2002/0013772 | A1 | 1/2002 | Peinado | 705/51 |
| 2002/0013785 | A1 | 1/2002 | Miyazaki et al. | 707/104 |
| 2002/0016853 | A1 | 2/2002 | Ressler | 709/236 |
| 2002/0016921 | A1 | 2/2002 | Olsen et al. | 713/200 |
| 2002/0019884 | A1 | 2/2002 | Gungabeesoon | 709/310 |
| 2002/0024419 | A1 | 2/2002 | Dunn | 349/5.52 |
| 2002/0038426 | A1 | 3/2002 | Pettersson et al. | 713/186 |
| 2002/0042883 | A1 | 4/2002 | Roux et al. | 713/201 |
| 2002/0055912 | A1 | 5/2002 | Buck | 705/76 |
| 2002/0056043 | A1 | 5/2002 | Glass | 713/179 |
| 2002/0062452 | A1 | 5/2002 | Ford | 713/201 |
| 2002/0083192 | A1 | 6/2002 | Alisuag | 709/237 |
| 2002/0087869 | A1 | 7/2002 | Kim | 713/186 |
| 2002/0101857 | A1 | 8/2002 | Heller | 713/168 |
| 2002/0133504 | A1 | 9/2002 | Vlahos et al. | 707/104 |
| 2002/0161766 | A1 | 10/2002 | Lawson et al. | 707/9 |
| 2002/0174010 | A1 | 11/2002 | Rice, III | 705/14 |
| 2003/0005134 | A1 | 1/2003 | Martin et al. | 709/229 |
| 2003/0033535 | A1 | 2/2003 | Fisher et al. | 713/185 |
| 2003/0065986 | A1 | 4/2003 | Fraenkel et al. | 714/47 |
| 2003/0140120 | A1 | 7/2003 | Hartman | 709/219 |
| 2003/0154403 | A1 | 8/2003 | Keinsley et al. | 713/201 |
| 2003/0177172 | A1 | 9/2003 | Duursma et al. | 709/203 |
| 2004/0103409 | A1 | 5/2004 | Hayner et al. | 717/143 |
| 2004/0181796 | A1* | 9/2004 | Fedotov et al. | 719/323 |
| 2004/0237071 | A1* | 11/2004 | Hollander et al. | 717/124 |
| 2005/0015286 | A1 | 1/2005 | Rudnikk et al. | 705/7 |
| 2005/0021975 | A1 | 1/2005 | Liu | 713/182 |
| 2005/0030374 | A1 | 2/2005 | Goldenberg et al. | 348/143 |
| 2005/0086255 | A1 | 4/2005 | Schran et al. | 707/102 |
| 2005/0138426 | A1 | 6/2005 | Styslinger | 713/201 |
| 2005/0144297 | A1 | 6/2005 | Dahlstrom et al. | 709/229 |
| 2005/0154886 | A1 | 7/2005 | Birk et al. | 713/168 |
| 2006/0123344 | A1* | 6/2006 | Volkov et al. | 715/730 |

FOREIGN PATENT DOCUMENTS

| | | |
|---|---|---|
| WO | 01/27723 | 4/2001 |
| WO | 02/03178 | 1/2002 |

OTHER PUBLICATIONS

International Search Report PCT/US 02/15469 dated Mar. 3, 2004.
International Search Report PCT/US 02/15466 dated Mar. 15, 2004.

* cited by examiner

METHODS AND SYSTEMS FOR PROVIDING RESPONSES TO SOFTWARE COMMANDS

TECHNICAL FIELD

This invention relates to methods and systems for providing automated responses to computer software applications and, more particularly, to methods and systems for intercepting and recognizing screen draw commands issued by the applications and providing automated responses thereto.

BACKGROUND INFORMATION

The number of computer applications used by large corporations has increased significantly over the past thirty years. For example, companies may employ separate applications for electronic mail, document control, financial applications, inventory management, manufacturing control and engineering functions, in addition to overall network access. Each application often requires a separate login procedure (including some form of personal identification such as a user ID, a password, a key sequence or biometric authentication) and other routine responses to screens, forms and messages during the initiation and/or operation of the application.

One approach to addressing the proliferation of user authentication credentials is to provide a single-sign-on application (either client-based or residing on a server) to which a user is authenticated by means of a unique credential (e.g., a biometric scan). Once the single credential is authenticated, IDs and passwords for various other applications are then provided to the client machine and used to access the individual applications. However, as programs are added to the user's application suite or application workflows are changed, new screens and input fields are introduced and various system configurations must be changed accordingly. Furthermore, many applications require a user to provide numerous, often repetitive inputs (in the form of data, mouse clicks, or keystrokes, for example) to complete simple tasks and navigate through an application.

In addition to the repetitive nature of user authentication, many operational tasks within applications require a user to repeat the same steps for many transactions. For example, a call-center application may require a user to confirm a caller's account number, recall recent account history, and retrieve text regarding current promotions deemed relevant to that caller. Each process may require the user to select a particular button, enter user data (e.g., an account number, a zip code, etc.) and request text messages from a server. Each of these steps requires additional time and introduces opportunities for error, thus increasing costs.

What is needed, therefore, are systems and techniques for facilitating the central management of user authentication, access, and computer system usage that can easily accommodate the introduction of new computer applications into a large computing environment and automate many of the redundant tasks associated with operating the applications.

SUMMARY OF THE INVENTION

The present invention automates responses to various software application commands that, absent the present invention, require manual user actions to complete. In response to initiation of an application from a client machine, instructions corresponding to generation of application screens are scrutinized at the client. For example, the client's memory allocations may be rewritten such that a system call filter is assigned to memory addresses previously assigned to operating system procedures or application libraries. As data and instructions are generated by the application (which can be client-based, server-based, and/or web-based) the client-based system recognizes commands related to the generation and rendering of application screens that require data entry and/or user interaction.

Upon issuing a command directed at the operating system or library, the application directs the command to the memory address at which the system commands were previously stored, even though the filter now occupies that address. As a result, the commands are never processed by the operating system; instead, the system filter intercepts them and scans the commands for screen-rendering requests. The present invention uses such commands to generate "virtual screen images" which are compared to stored "screen templates." These specify the data that the user would be expected to enter into the rendered screen and the locations for such entry serve to provide predetermined responses to the screens (e.g., passwords, biometric authentication information, object selection messages, mouse events, text responses). These responses are then presented back to the application via the application message queue.

In effect, applications are automatically provided with data and instructions based on the low-level operating system commands used to produce screen images before the screens are actually rendered by the operating system or presented to the user. In this way, the user is not burdened by various login processes or repetitive processes, and need not maintain awareness of the different requirements of each screen she may encounter. The system can automatically complete many of the repetitive tasks associated with operating the application.

Accordingly, in a first aspect, a method for providing a response to a software program includes providing a system call filter for monitoring system commands issued by a software program. The commands are directed to a procedure (such as an operating system or application procedure) assigned to a particular memory address (or sets of memory addresses, in RAM, for example) on a client computer. The memory allocations of the client computer are redirected such that the memory addresses previously attributed to the system procedures are reassigned to the system call filter, thus allowing the system call filter to monitor and/or intercept the commands issued by the software program. Certain commands (or sets of commands) are recognized as commands relating to an application event (e.g., a screen draw event or other object event) and an appropriate response to the event is determined and provided to the software program.

Allocation of memory on the client computer may take place prior to the issuance of a command from the software program, and may be such that the procedure is allocated to a second memory address on the client computer. The response may be provided by inserting the response into a messaging queue. In some embodiments, the commands include one or more parameters, which may be modified, and may also be used to determine a response to the commands. Templates representing screen images from the software application may be provided and compared with virtual screen images based on the intercepted commands. In some cases stored responses attributed to the templates are provided and one or more of the stored responses can be presented to the software application. The stored responses can include user authentication information, transaction response information, as well as other commands directed to the application.

The software program can reside on a client, a server, or some combination thereof, and can communicate with a client over a network such as an local area network, a wide area network, a virtual private network, and/or the Internet. In some embodiments, the client comprises a remote access server and acts as a client to other application or web servers while providing access to clients on the network.

In another aspect, a system for providing a response to a software program comprises a system call filter, a system memory module, a recognition engine, and a client agent. The system call filter monitors and intercepts system commands issued by a software program. The commands are typically directed to a procedure (e.g., an operating system function or application procedure) assigned to a memory address on a client machine. To allow the filter to intercept the system calls, the memory module reassigns memory allocations on the client machine such that the system call filter is assigned the memory address previously assigned to the procedure called by the system command. The recognition engine scans the intercepted system commands, identifies those commands related to particular application events, and determines an appropriate response thereto. The client agent provides the responses to the application, using, for example, an application message queue.

The system can also include a template database for storing templates representing screen images, which in some embodiments can be compared to virtual screen images generated by the client agent to determine appropriate responses to the intercepted commands.

In another aspect, a client-resident apparatus configured to provide automated responses to software applications includes a rendering module for generating virtual screen images based on system commands intercepted between a software application and an operating system such that the operating system remains unaware of the system commands, a communications module for receiving stored responses to the virtual screen images based on a comparison of the virtual screen images to screen image templates, and a messaging module for providing the stored responses to the software application. By "unaware" is meant that the commands are not processed by and do not affect the operating system.

In another aspect, the invention comprises an article of manufacture having a computer-readable medium with the computer-readable instructions embodied thereon for performing the methods described in the preceding paragraphs. In particular, the functionality of a method of the present invention may be embedded on a computer-readable medium, such as, but not limited to, a floppy disk, a hard disk, an optical disk, a magnetic tape, a PROM, an EPROM, CD-ROM, or DVD-ROM. The functionality of the techniques may be embedded on the computer-readable medium in any number of computer-readable instructions, or languages such as, for example, FORTRAN, PASCAL, C, C++, Java, C#, Tcl, BASIC and assembly language. Further, the computer-readable instructions may, for example, be written in a script, macro, or functionally embedded in commercially available software (such as, e.g., EXCEL or VISUAL BASIC).

The foregoing and other objects, features and advantages of the present invention disclosed herein, as well as the invention itself, will be more fully understood from the following description of preferred embodiments and claims, when read together with the accompanying drawings.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the invention.

DETAILED DESCRIPTION

Figure 1:
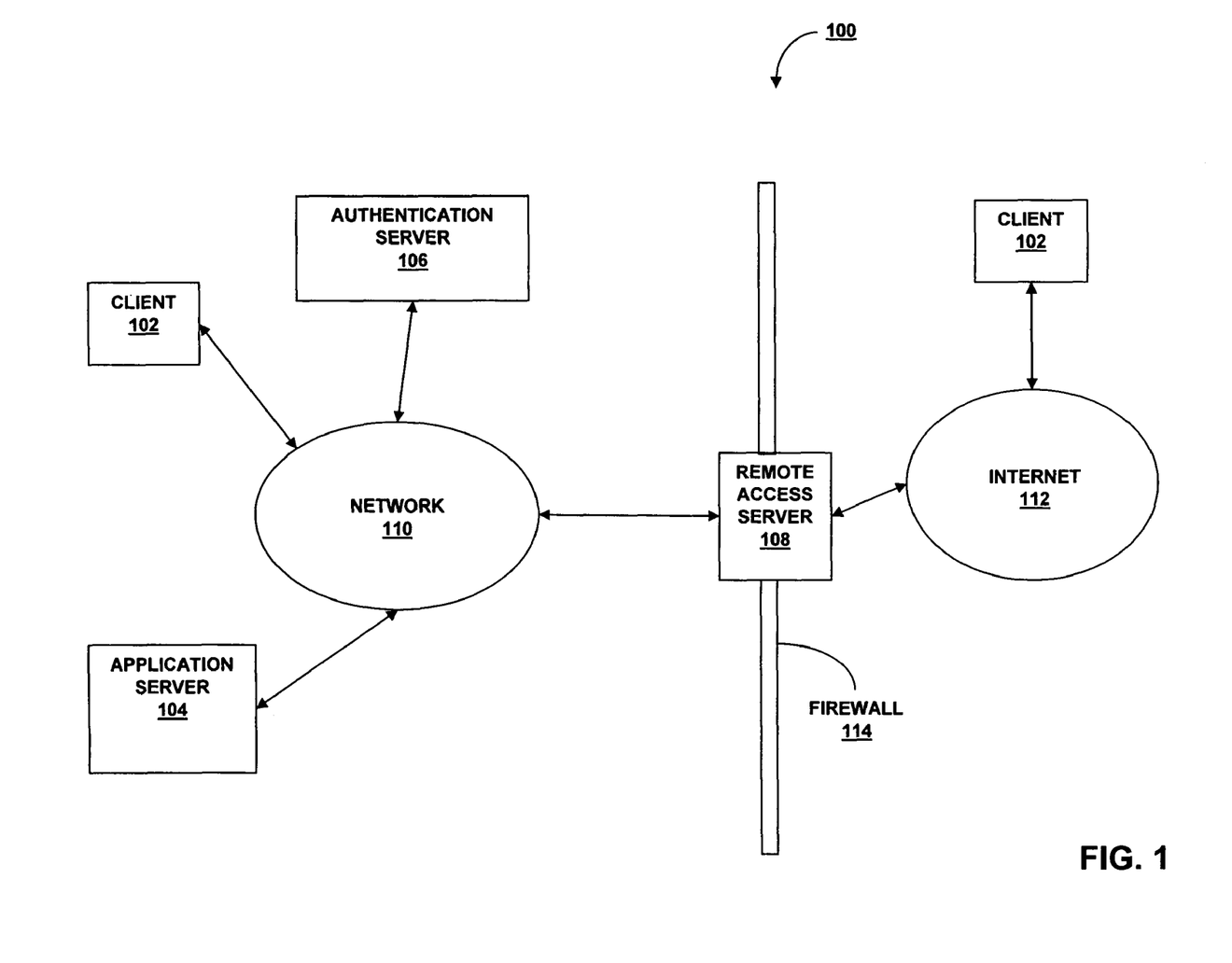
FIG. 1 schematically illustrates an environment in which the application monitoring processes of various embodiments of the invention may operate.

In broad overview, FIG. 1 illustrates an environment 100 in which the various techniques, systems and apparatus can be implemented to automate user authentication and computer application usage. The environment 100 includes one or more client devices 102 and may also include one or more server devices, including, without limitation, an application server 104, an authentication server 106, and a remote access server 108. Each of the client devices 102 and servers 104, 106 and 108 are in communication with a computer network 110 and the Internet 112 using various communication channels.

In one embodiment, the client devices 102 can be implemented as a system including software running on a personal computer (e.g., a PC with an INTEL processor or an APPLE MACINTOSH) capable of running such operating systems as the MICROSOFT WINDOWS family of operating systems from Microsoft Corporation of Redmond, Wash., the MACINTOSH operating system from Apple Computer of Cupertino, Calif., and various varieties of Unix, such as SUN SOLARIS from SUN MICROSYSTEMS, and GNU/Linux from RED HAT, INC. of Durham, N.C. (and others). The client devices 102 also can be implemented on such hardware as a smart or dumb terminal, network computer, wireless device, telephone, personal digital assistant, media player, information appliance, workstation, minicomputer, mainframe computer, or some combination, or as another computing device, that is operated, for example, as a general purpose computer, or a special purpose hardware device used solely for serving as a client device 102 in the environment 100.

In one embodiment, the servers 104, 106, and 108 are implemented using one or more server-class computers capable of running such operating systems as the MICROSOFT WINDOWS family of operating systems from Microsoft Corporation of Redmond, Wash., the MACINTOSH operating system from Apple Computer of Cupertino, Calif., and various varieties of Unix, such as SUN SOLARIS from SUN MICROSYSTEMS, and GNU/Linux from RED HAT, INC. of Durham, N.C. (and others). Web service software, such as the APACHE software, provided by the Apache Software Foundation, or INTERNET INFORMATION SERVICES from Microsoft Corporation may be used to provide web-based content to the clients 102.

The communications networks that connect the client devices 102 with the servers 104, 106 and 108 can use any media or any combination of media such as standard telephone lines, LAN or WAN links (e.g., T1, T3, 56 kb, X.25), broadband connections (ISDN, Frame Relay, ATM), and wireless links (cellular, 802.11, Bluetooth, etc.). Preferably, the network carries TCP/IP protocol communications, and HTTP/HTTPS requests made by the client devices 102 to the servers 104, 106 and 108. The type of network is not a limitation, however, and any suitable network(s) and protocol(s) may be used. Non-limiting examples of networks that can serve as or be part of the communications network include a wireless or wired Ethernet-based intranet 110, a local or wide-area network (LAN or WAN), and/or the global communications network known as the Internet 112, which can accommodate many different communications media and protocols, and any variation or combination. In instances where the client device 102 communicates with the application server 104 using an untrusted connection (e.g., from outside a corporate intranet, from an unknown domain, or beyond a firewall 114) the network communications can utilize a remote access server 108 such as a RADIUS server, which provides the necessary session-level security and authentication to provide the client 102 with access to secure systems and applications hosted within the firewall 114.

In one embodiment, a user located at a client device 102 (either directly connected to the network 110 or remotely connected via the Internet 112 and the remote access server 108) attempts to gain access to and use applications residing on the application server 104. The applications residing on the application server 104 can provide various services, including, by way of example only, network access, accounting services, software development services, on-line transaction processing services, document processing services, as well as others.

To gain access to the desired application(s), the user generally is required to provide some form of a user authentication credential. User authentication credentials are typically classified into one of three categories—something a user knows (e.g., a password), something a user has (e.g., a token or smartcard), and something a user is (e.g., a biometric credential such as a fingerprint, retinal scan, facial scan, voiceprint, DNA sequence, or the like). During the user authentication process, and once access is granted, the applications present to the user various screens, input fields, and buttons as screen objects that the user manipulates (by, for example, completing a text field, clicking on a button, navigating to a particular web page) to effectuate some desired action in the application. Many of these actions are repetitive in nature (e.g., they are done each time a user logs in or performs a particular function) and often use the same data for each occurrence. It is these repetitive, predictable events (which often rely on user-provided input for the application to continue operating) that the invention aims to automate and, in some cases, eliminate.

Figure 2:
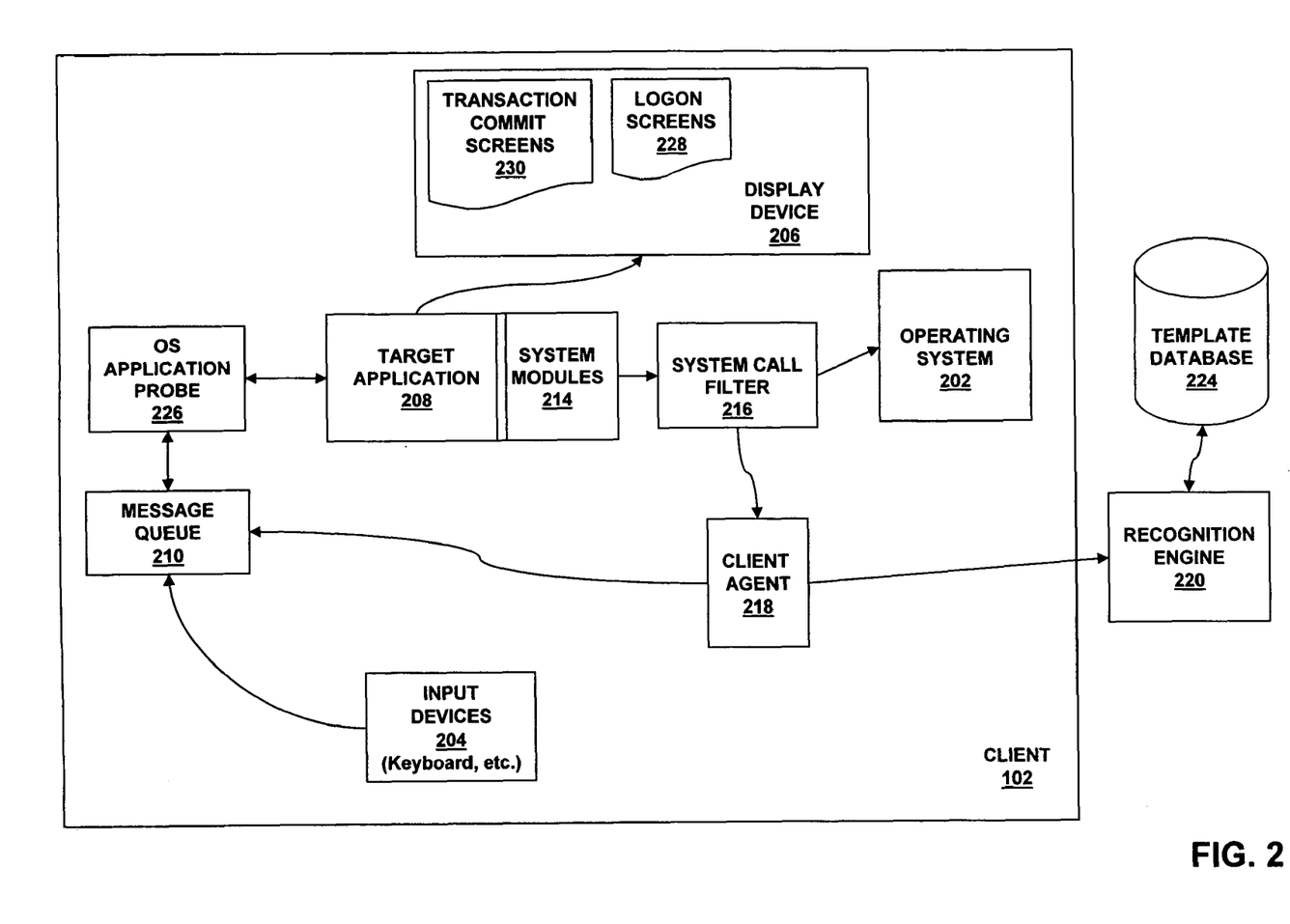
FIG. 2 is a schematic diagram of a system adapted to practice the methods according to one embodiment of the invention.

Referring to FIG. 2, the client 102 includes various components, some being embodied in software, such as an operating system 202, and some embodied in hardware, such as various input devices 204 (e.g., a keyboard, a mouse, a biometric input device, a pointer, etc.), memory, storage devices, and a display 206. In addition to the operating system 202, one or more target applications 208 (or in some cases, components of applications) reside on the client 102. For example, the software code for application 208 (which may be, for example, a word processing application, a spreadsheet application, or an Internet browser) may reside solely within the various storage devices of the client 102. In such cases, the various components of the application 208 are generally stored in non-volatile memory (e.g., on a "hard drive" of the client) and loaded into random access memory (RAM) when the application 208 is started. In other embodiments, the application 208 may reside on a server (e.g., the application server 104 of FIG. 1) and provide one or more components to the client 102 only when needed. The memory locations of the various application components (as well as operating system modules) are determined upon instantiation of the application by an application loader. Typically, components of active, running applications are stored in RAM on the client 102 until an application is terminated, at which point the components are removed from RAM. In some embodiments, the components of application 208 can reside on a number of devices, depending, for example, on processing requirements, geographical constraints, and other architectural considerations.

In a typical implementation, the application 208 interacts with the operating system 202 (and potentially other applications) through the use of system modules 214. For example, on a client using a WINDOWS-based operating system, the system modules 214 process requests from the applications 208 operating on the client 102 to the operating system 202. This allows interactive applications to operate using an "event-driven" model (e.g., mouse clicks, screen renderings, HTTP requests, keystrokes, etc.). In instances where the application needs an action to be taken by the operating system 202, the application typically determines the proper system module that can process the request (e.g., a library) and sends a command to the module to effectuate the action. To confirm that the action is complete (e.g., the screen is rendered), the application monitors the application message queue 210 for an indication, for example, that a data field has been completed and a form posted to the server, an object has been selected, or a series of characters typed.

In various embodiments, the present invention automates many of these processes by providing a system call filter 216 and a client agent 218 that, in combination with a recognition engine 220 and a template database 224, emulate operating-system procedures and user input. In some cases, these components reside on the client 102 (to allow use of secure applications when not physically connected to the network, for example), whereas in other embodiments certain components, such as the recognition engine 220 and/or the template database 224, reside on the authentication server 106.

To implement the system call filter 216, memory assignments on the client 102 are rewritten such that the memory addresses associated with various system modules (e.g., DLLs) are reallocated to the system call filter 216. For example, in one embodiment, a jump table provides a listing of the memory addresses for various routines and associates a numerical value (typically an integer) or a memory address with each table entry. When an application invokes the routine, it refers to the jump table to find the memory address associated with the routine. Substituting the address of the system call filter for the addresses associated with various system modules causes an application 208 seeking to invoke a particular routine or procedure by issuing a command to that routine to "unknowingly" send the commands instead to the system call filter 216. As a result, the commands intended for the operating system are instead intercepted by the system call filter 216. Effectively, the application is suspended because the operating system does not process the system call, and thus cannot provide the expected message to the application message queue 210 indicating that the command has been completed.

The system call filter 216 scans the commands received from the application 208 and determines which commands are related to various application and/or operating system events. Although the system call filter 216 can receive and identify any command, screen draw commands are of particular interest, as these commands generally instruct the operating system to present screens (e.g., screens 228 and 230) to the user that prompt user action. As a result, the application 208 halts processing and awaits a response in the form of a message inserted into the application message queue 210. The filter 216 identifies those commands that indicate application events (by, for example, comparing the commands to a previously-compiled list of commands corresponding to such events) and provides the commands to the client agent 218. The commands can be sent to the agent 218 individually, in groups (defined, for example, by a common parameter such as a window handle or object name, or based on a particular time segment) or in bulk.

In some embodiments, an application probe 226 (also referred to as a "hook") is inserted between the message queue 210 and the application 208. The probe 226 intercepts messages directed to the application 208 via the message queue 210 before the messages are received by the application and, if necessary, the probe 226 may act on the messages. In a manner similar to the way the system call filter 216 intercepts commands from the application 208 to the operating system 202, the application probe 226 intercepts messages to the application 208. By intercepting the messages being sent to the application 208, the probe 226 (or the system generally) can act on the messages before they reach the application 208.

For example, the system messages below represent the process of hooking into commands being generated by a secure shell client application that communicates via a window:

---

09:17:46 HOK SshClient Resetting GDI capture for hwnd: 0x000206d6
09:17:46 HOK SshClient Unable to get import table for module:
0x7c900000 [
c:\windows\system32\ntdll.dll ]
09:17:46 HOK SshClient Unable to get import table for module:
0x20000000 [
c:\windows\system32\xpsp2res.dll ]
09:17:46 HOK SshClient Initializing GDI Signature capture for
hWnd: 0x000206d6

---

Once the system call filter is initiated, it modifies the memory address allocations for system modules such as Kernal32, User32 and OLE32 used in the MICROSOFT WINDOWS operating system. Such modifications may be represented by the following messages, for example:

---

09:17:46 HOK SshClient Modifying: KERNEL32 Starting: 0 Count: 5
09:17:46 HOK SshClient Modifying: USER32 Starting: 5 Count: 23
09:17:46 HOK SshClient Modifying: GDI32 Starting: 28 Count: 20
09:17:46 HOK SshClient Modifying: USP10 Starting: 48 Count: 5
09:17:46 HOK SshClient Modifying: OLE32 Starting: 53 Count: 0
09:17:46 HOK SshClient Unable to get module handle for USP10
09:17:46 HOK SshClient Modifying: KERNEL32 Starting: 0 Count: 4
09:17:46 HOK SshClient Modifying: USER32 Starting: 4 Count: 0
09:17:46 HOK SshClient Modifying: GDI32 Starting: 4 Count: 0
09:17:46 HOK SshClient Modifying: USP10 Starting: 4 Count: 0
09:17:46 HOK SshClient Modifying: OLE32 Starting: 4 Count: 0
09:17:46 HOK SshClient Unable to get module handle for USP10
09:17:46 HOK SshClient IPTXEnumProc::initSessID( )
ProcessId(964) −> SessionId(0)
09:17:46 HOK SshClient IPTXEnumProc::initForWin2k( ) - True

---

The hooking process may redirect calls to specific modules. For example, calls to the operating system function such as LoadLibraryA within Kernel32 may be redirected to a wrapper function as part of the system call filter. This may be done for a specific set of functions within Kernel32, User32, GDI132 as well as other operating system and/or application functions such that the system maintains adequate coverage of system calls. For example, functions such as DrawTextA, TextOutA, ExtTextOutA are functions that instruct a client to display text at a given location either on the user's screen or into non-displayable (off screen) memory such that it can be painted to the display at a later time. Because of this caching of text, the invention also tracks the generation and management of memory-based bitmap images and how they are used. Other system functions such as LoadLibrary and GetProcAddress are tracked to detect when an application directly loads a system library, as opposed to when the loader dynamically loads the libraries. Examples of the redirected calls to specific modules are shown below:

---

09:17:46 HOK SshClient Hooking module: 0x00400000 [c:\program files\ssh communications
security\ssh secure shell\sshclient.exe ]
09:17:46 HOK SshClient Redirecting { 0x7c801d77 }−>{ 0x10037a32 }
KERNEL32 :: LoadLibraryA in module: KERNEL32.dll
09:17:46 HOK SshClient Redirecting { 0x7c80ac28 }−>{ 0x100374e7 }
KERNEL32 :: GetProcAddress in module: KERNEL32.dll
09:17:46 HOK SshClient Hooking module: 0x7c800000 [ c:\windows\system32\kernel32.dll ] within
dll: c:\program files\ssh communications security\ssh secure shell\sshclient.exe
09:17:46 HOK SshClient Redirecting { 0x77d49021 }−>{ 0x1003814e }
USER32 :: GetWindowDC in module: USER32.dll
09:17:46 HOK SshClient Redirecting { 0x77d5f902 }−>{ 0x10037325 }
USER32 :: FrameRect in module: USER32.dll
09:17:46 HOK SshClient Redirecting { 0x77d49056 }−>{ 0x10038496 }
USER32 :: SetScrollInfo in module: USER32.dll
09:17:46 HOK SshClient Redirecting { 0x77d4c257 }−>{ 0x100374d8 }
USER32 :: FillRect in module: USER32.dll
09:17:46 HOK SshClient Redirecting { 0x77d4869d }−>{ 0x10038838 }
USER32 :: ReleaseDC in module: USER32.dll
09:17:46 HOK SshClient Redirecting { 0x77d7f972 }−>{ 0x100371d1 }
USER32 :: InvertRect in module: USER32.dll
09:17:46 HOK SshClient Hooking module: 0x77d40000 [ c:\windows\system32\user32.dll ]
within dll: c:\program files\ssh communications security\ssh secure shell\sshclient.exe
09:17:46 HOK SshClient Redirecting { 0x77f16fb2 }−>{ 0x10037406 } GDI32 ::
BitBlt in module: GDI32.dll
09:17:46 HOK SshClient Redirecting { 0x77f1ec6c }−>{ 0x10037258 } GDI32 ::
Rectangle in module: GDI32.dll
09:17:46 HOK SshClient Redirecting { 0x77f1d452 }−>{ 0x10037aff } GDI32 ::
ExtTextOutA in module: GDI32.dll
09:17:46 HOK SshClient Redirecting { 0x77f1620f }−>{ 0x10038743 } GDI32 ::
CreateBitmap in module: GDI32.dll

```
09:17:46 HOK SshClient TextOutA( 0x04010459 4 109 11 ) ->
09:17:46 HOK SshClient GDI-WRAP SetScrollInfo: 0x000206d8 (fnBar: 1 fMask: 15 nMin: 476
nMax: 499 nPage: 23 nPos: 476
09:17:46 HOK SshClient
09:17:46 HOK SshClient TextOutA( 0x04010459 4 4 34 34 ) -> SSH Secure Shell 3.2.0 (Build 267)
09:17:46 HOK SshClient GDI-WRAP WrapFillRect 0x04010459 0 4 4 19 ) GDI-WRAP ->
CaptureControlRect( 0x04010459 0 4 4 19 ) CaptureControlRect( 0x04010459 0 4 4 19 )
09:17:46 HOK SshClient TextOutA( 0x04010459 4 19 59 59 ) -> Copyright (c) 2000-2002 SSH
Communications Security Corp -
09:17:46 HOK SshClient GDI-WRAP WrapFillRect 0x04010459 0 19 4 34 ) GDI-WRAP ->
CaptureControlRect( 0x04010459 0 19 4 34 ) CaptureControlRect( 0x04010459 0 19 4 34 )
09:17:46 HOK SshClient TextOutA( 0x04010459 417 19 19 19 ) -> http://www.ssh.com/
09:17:46 HOK SshClient TextOutA( 0x04010459 4 49 58 58 ) -> This copy of SSH Secure Shell is
a non-commercial version.
09:17:46 HOK SshClient GDI-WRAP WrapFillRect 0x04010459 0 49 4 64 ) GDI-WRAP ->
CaptureControlRect( 0x04010459 0 49 4 64 ) CaptureControlRect( 0x04010459 0 49 4 64 )
09:17:46 HOK SshClient TextOutA( 0x04010459 4 64 61 61 ) -> This version does not include PKI
and PKCS #11 functionality.
09:17:46 HOK SshClient GDI-WRAP WrapFillRect 0x04010459 0 64 4 79 ) GDI-WRAP ->
CaptureControlRect( 0x04010459 0 64 4 79 ) CaptureControlRect( 0x04010459 0 64 4 79 )
09:17:46 HOK SshClient TextOutA( 0x04010459 4 109 11 ) ->
09:17:47 HOK SshClient TextOutW( 0x84010797 573 3 1 ) -> o
09:17:47 HOK SshClient TextOutW( 0x84010797 573 3 1 ) -> p
09:17:47 HOK SshClient TextOutA( 0x190102c2 4 94 1 1 ) ->
09:17:47 HOK SshClient GDI-WRAP SetScrollInfo: 0x000206d8 (fnBar: 1 fMask: 15 nMin: 476
nMax: 499 nPage: 24 nPos: 476
09:17:47 HOK SshClient
09:17:47 HOK SshClient TextOutA( 0x190102c2 4 4 34 34 ) -> SSH Secure Shell 3.2.0 (Build 267)
09:17:47 HOK SshClient GDI-WRAP WrapFillRect 0x190102c2 0 4 4 19 ) GDI-WRAP ->
CaptureControlRect( 0x190102c2 0 4 4 19 ) CaptureControlRect( 0x190102c2 0 4 4 19 )
09:17:47 HOK SshClient TextOutA( 0x190102c2 4 19 59 59 ) -> Copyright (c) 2000-2002 SSH
Communications Security Corp -
09:17:47 HOK SshClient GDI-WRAP WrapFillRect 0x190102c2 0 19 4 34 ) GDI-WRAP ->
CaptureControlRect( 0x190102c2 0 19 4 34 ) CaptureControlRect( 0x190102c2 0 19 4 34 )
09:17:47 HOK SshClient TextOutA( 0x190102c2 417 19 19 19 ) -> http://www.ssh.com/
09:17:47 HOK SshClient TextOutA( 0x190102c2 4 49 58 58 ) -> This copy of SSH Secure Shell is a
non-commercial version.
09:17:47 HOK SshClient GDI-WRAP WrapFillRect 0x190102c2 0 49 4 64 ) GDI-WRAP ->
CaptureControlRect( 0x190102c2 0 49 4 64 ) CaptureControlRect( 0x190102c2 0 49 4 64 )
09:17:47 HOK SshClient TextOutA( 0x190102c2 4 64 61 61 ) -> This version does not include PKI
and PKCS #11 functionality.
09:17:47 HOK SshClient GDI-WRAP WrapFillRect 0x190102c2 0 64 4 79 ) GDI-WRAP ->
CaptureControlRect( 0x190102c2 0 64 4 79 ) CaptureControlRect( 0x190102c2 0 64 4 79 )
09:17:47 HOK SshClient TextOutA( 0x190102c2 4 109 1 1 ) ->
09:17:47 HOK SshClient TextOutW( 0x84010797 573 3 1 ) -> o
09:17:47 HOK SshClient TextOutW( 0x84010797 573 3 1 ) -> p
09:17:47 HOK SshClient GDI-WRAP WrapFillRect 0x190102c2 0 0 4 368 ) GDI-WRAP ->
CaptureControlRect( 0x190102c2 0 0 4 368 ) CaptureControlRect( 0x190102c2 0 0 4 368 )
09:17:47 HOK SshClient GDI-WRAP WrapFillRect 0x190102c2 564 0 568 368 ) GDI-WRAP ->
CaptureControlRect( 0x190102c2 564 0 568 368 ) CaptureControlRect( 0x190102c2 564 0 568 368 )
09:17:47 HOK SshClient GDI-WRAP WrapFillRect 0x190102c2 0 0 568 4 ) GDI-WRAP ->
CaptureControlRect( 0x190102c2 0 0 568 4 ) CaptureControlRect( 0x190102c2 0 0 568 4 )
09:17:47 HOK SshClient GDI-WRAP WrapFillRect 0x190102c2 0 364 568 368 ) GDI-WRAP ->
CaptureControlRect( 0x190102c2 0 364 568 368 ) CaptureControlRect( 0x190102c2 0 364 568 368 )
09:17:47 HOK SshClient TextOutA( 0x190102c2 4 109 11 ) ->
09:17:47 HOK SshClient TextOutA( 0x190102c2 4 4 34 34 ) -> SSH Secure Shell 3.2.0 (Build 267)
09:17:47 HOK SshClient GDI-WRAP WrapFillRect 0x190102c2 0 4 4 19 ) GDI-WRAP ->
CaptureControlRect( 0x190102c2 0 4 4 19 ) CaptureControlRect( 0x190102c2 0 4 4 19 )
09:17:47 HOK SshClient TextOutA( 0x190102c2 4 19 59 59 ) -> Copyright (c) 2000-2002 SSH
Communications Security Corp -
09:17:47 HOK SshClient GDI-WRAP WrapFillRect 0x190102c2 0 19 4 34 ) GDI-WRAP ->
CaptureControlRect( 0x190102c2 0 19 4 34 ) CaptureControlRect( 0x190102c2 0 19 4 34 )
09:17:47 HOK SshClient TextOutA( 0x190102c2 417 19 19 19 ) -> http://www.ssh.com/
09:17:47 HOK SshClient TextOutA( 0x190102c2 4 49 58 58 ) -> This copy of SSH Secure Shell is a
non-commercial version.
09:17:47 HOK SshClient GDI-WRAP WrapFillRect 0x190102c2 0 49 4 64 ) GDI-WRAP ->
CaptureControlRect( 0x190102c2 0 49 4 64 ) CaptureControlRect( 0x190102c2 0 49 4 64 )
```

The following trapped commands, for example, represent the drawing of an application menu that are captured and redirected to the client agent for virtual rendering:

```
09:17:47 HOK SshClient DrawTextA( 0xc9010909 9 2 5 5 32 ) ->
&File
09:17:47 HOK SshClient TextOutW( 0xc9010909 9 2 4 ) ->
File
09:17:47 HOK SshClient DrawTextA( 0xc9010909 38 2 5 5 32 ) ->
&Edit
09:17:47 HOK SshClient TextOutW( 0xc9010909 38 2 4 ) ->
Edit
09:17:47 HOK SshClient DrawTextA( 0xc9010909 69 2 5 5 32 ) ->
&View
```

-continued
```
09:17:47 HOK SshClient TextOutW( 0xc9010909 69 2 4 ) ->
View
09:17:47 HOK SshClient DrawTextA( 0xc9010909 104 2 7 7 32 ) ->
&Window
09:17:47 HOK SshClient TextOutW( 0xc9010909 104 2 6 ) ->
Window
09:17:47 HOK SshClient DrawTextA( 0xc9010909 155 2 5 5 32 ) ->
&Help
09:17:47 HOK SshClient TextOutW( 0xc9010909 155 2 4 ) ->
Help
```

Some of all of the collected text is aggregated and marked as label text with an associated value. The set of labels is then used by the client agent 218 to determine if a particular screen and/or if the application is running in as specific context. In the example below, each element is assigned to label 1 with a unique control ID (1 through 17) to identify the screen and the elements within the screen.

```
09:17:47 Agent ISXAgent [ 0 ] Type: Label (1) ControlID: 1 Index: 0 Class: ' GDILabel ' Text: '
SSH Secure Shell 3.2.0 (Build 267) ' lt: 4 tp: 4 wd: 249 ht: 19
09:17:47 Agent ISXAgent [ 1 ] Type: Label (1) ControlID: 2 Index: 0 Class: ' GDILabel ' Text: '
Copyright (c) 2000-2002 SSH Communications Security Corp - ' lt: 4 tp: 19 wd: 424 ht: 34
09:17:47 Agent ISXAgent [ 2 ] Type: Label (1) ControlID: 3 Index: 0 Class: ' GDILabel ' Text: '
http://www.ssh.com/ ' lt: 417 tp: 19 wd: 557 ht: 34
09:17:47 Agent ISXAgent [ 3 ] Type: Label (1) ControlID: 4 Index: 0 Class: ' GDILabel ' Text: '
This copy of SSH Secure Shell is a non-commercial version. ' lt: 4 tp: 49 wd: 417 ht: 64
09:17:47 Agent ISXAgent [ 4 ] Type: Label (1) ControlID: 5 Index: 0 Class: ' GDILabel ' Text: '
This version does not include PKI and PKCS #11 functionality. ' lt: 4 tp: 64 wd: 438 ht: 79
09:17:47 Agent ISXAgent [ 5 ] Type: Label (1) ControlID: 6 Index: 0 Class: ' GDILabel ' Text: '
Quick Connect ' lt: 26 tp: 3 wd: 106 ht: 16
09:17:47 Agent ISXAgent [ 6 ] Type: Label (1) ControlID: 7 Index: 0 Class: ' GDILabel ' Text: '
Profiles ' lt: 128 tp: 3 wd: 174 ht: 16
09:17:47 Agent ISXAgent [ 7 ] Type: Label (1) ControlID: 8 Index: 0 Class: ' GDILabel ' Text: '
&File ' lt: 9 tp: 2 wd: 43 ht: 15
09:17:47 Agent ISXAgent [ 8 ] Type: Label (1) ControlID: 9 Index: 0 Class: ' GDILabel ' Text: '
File ' lt: 9 tp: 2 wd: 36 ht: 15
09:17:47 Agent ISXAgent [ 9 ] Type: Label (1) ControlID: 10 Index: 0 Class: ' GDILabel ' Text: '
&Edit ' lt: 38 tp: 2 wd: 74 ht: 15
09:17:47 Agent ISXAgent [ 10 ] Type: Label (1) ControlID: 11 Index: 0 Class: ' GDILabel ' Text: '
Edit ' lt: 38 tp: 2 wd: 67 ht: 15
09:17:47 Agent ISXAgent [ 11 ] Type: Label (1) ControlID: 12 Index: 0 Class: ' GDILabel ' Text: '
&View ' lt: 69 tp: 2 wd: 109 ht: 15
09:17:47 Agent ISXAgent [ 12 ] Type: Label (1) ControlID: 13 Index: 0 Class: ' GDILabel ' Text: '
View ' lt: 69 tp: 2 wd: 102 ht: 15
09:17:47 Agent ISXAgent [ 13 ] Type: Label (1) ControlID: 14 Index: 0 Class: ' GDILabel ' Text: '
&Window ' lt: 104 tp: 2 wd: 160 ht: 15
09:17:47 Agent ISXAgent [ 14 ] Type: Label (1) ControlID: 15 Index: 0 Class: ' GDILabel ' Text: '
Window ' lt: 104 tp: 2 wd: 153 ht: 15
09:17:47 Agent ISXAgent [ 15 ] Type: Label (1) ControlID: 16 Index: 0 Class: ' GDILabel ' Text: '
&Help ' lt: 155 tp: 2 wd: 194 ht: 15
09:17:47 Agent ISXAgent [ 16 ] Type: Label (1) ControlID: 17 Index: 0 Class: ' GDILabel ' Text: '
Help ' lt: 155 tp: 2 wd: 187 ht: 15
```

The client agent 218 emulates the operating system by generating "virtual" screen images based on the commands received from the filter 216. For example, a "virtual" screen refers to a command or set of commands that when processed by an operating system render an actual screen for presentation for a user, but because the commands are not sent to the operating system, remain unprocessed, but, because of the particular types of commands and/or parameters, are still recognizable as a screen. The client agent 218 then transmits these commands to the recognition engine 220, which, by comparing the commands to previously stored commands that were previously associated with a particular screen or application templates (or other application event), identifies the command set as relating to a particular screen.

Further, responses for the recognized screen, having been previously stored in database 224 and associated with the screen may then be provided to the application 208 via the application message queue 240. In one example, the application 208 issues a series of commands that, absent the call filter 216, would normally instruct the operating system to render a login screen having numerous objects such as text fields, text boxes, and action buttons. However, by placing the system call filter 216 at the memory address normally allocated to the operating system modules that are responsible for drawing such a screen, the commands are not processed by operating system 202 and therefore the screen is not seen by the user. Instead, processing is diverted to the client agent 218 and recognition engine 220.

A login screen, for example, may include objects defining a textbox with the handle htxtbox_ID and having properties that permit a user to enter a user ID into the textbox; a textbox with the handle htxtbox_psswd and having properties that permit a user to enter a password into the textbox; a button with the handle hbtn_OK that, when selected, posts the values in the text boxes to the server; and a button with the handle hbtn_cancel that, when selected by the user, clears any values from the text boxes. Because each object is associated with the same screen, they share the same window handle (typically of the form hWND_login), indicating to the system call filter 216 that each of these objects is associated with a single screen. Further, because of the naming conventions used to identify the objects (i.e., "login," "ID," and "psswd"), the filter 216 can identify the common screen as a login screen. Alternatively or in addition, other characteristics of the screen and the objects thereon may also be captured, such as the physical screen location (which can be measured in absolute terms such as pixels or inches or in relative terms in comparison with other screens and objects), screen colors, HTML tags, XML data tags, images embedded on the screen (e.g., application logos) and the like. Each element adds to the particular "fingerprint" of the screen type and function, making it possible to programmatically identify the screen without human intervention (or exclusive reliance on object naming conventions).

In some embodiments, the degree of match between a virtual screen rendered by the client agent and the template provided by the template database need not be absolute. For example, as screens evolve through application updates, a high percentage of the screen attributes may remain constant (e.g., the screen name, and various objects within the screen) while new screen objects are added. In some cases, the process of matching the virtual screens to the stored templates can include thresholds that define a minimum degree of match adequate to allow the automated responses to be forwarded to the application. Further, individual elements of a screen may be weighted such that particular objects (e.g., a login text box and screen name) must match whereas other objects (logos, locations, etc.) are allowed to vary.

In addition to storing the templates for comparison purposes, the template database 224 can also include one or more responses for each screen such that when a screen is "recognized," the proper responses are provided to the client agent 218. Using the login screen described above as an example, the template database can associate a user name, a password, and a mouse-click event message with the login screen. In some embodiments, the username field may be populated (either automatically using a cookie or other stored data item or manually by the user) and used to select the proper password to associate with the screen. In some cases, all the necessary responses are provided automatically, based, for example, on a previously provided and authenticated biometric credential. Thus, the system can determine the proper responses that are to be provided to a particular screen generated by an application and pass the responses back to the application, all without interaction of the operating system or any user input (or actual screen rendering), greatly accelerating the application login process and use of the application.

In some embodiments, the system call filter 216, client agent 218, recognition engine 220 and template database 224 implement the functionality of the present invention in hardware or software, or a combination of both on a general-purpose computer. In addition, such a program may set aside portions of a computer's RAM to provide control logic that affects one or more of the message interception, message filtering, screen rendering, comparison, and response retrieval. In such an embodiment, the program may be written in any one of a number of high-level languages, such as FORTRAN, PASCAL, C, C++, C#, Java, Tcl, or BASIC. Further, the program can be written in a script, macro, or functionality embedded in commercially available software, such as EXCEL or VISUAL BASIC. Additionally, the software could be implemented in an assembly language directed to a microprocessor resident on a computer. For example, the software can be implemented in Intel 80×86 assembly language if it is configured to run on an IBM PC or PC clone. The software may be embedded on an article of manufacture including, but not limited to, "computer-readable program means" such as a floppy disk, a hard disk, an optical disk, a magnetic tape, a PROM, an EPROM, or CD-ROM.

Figure 3:
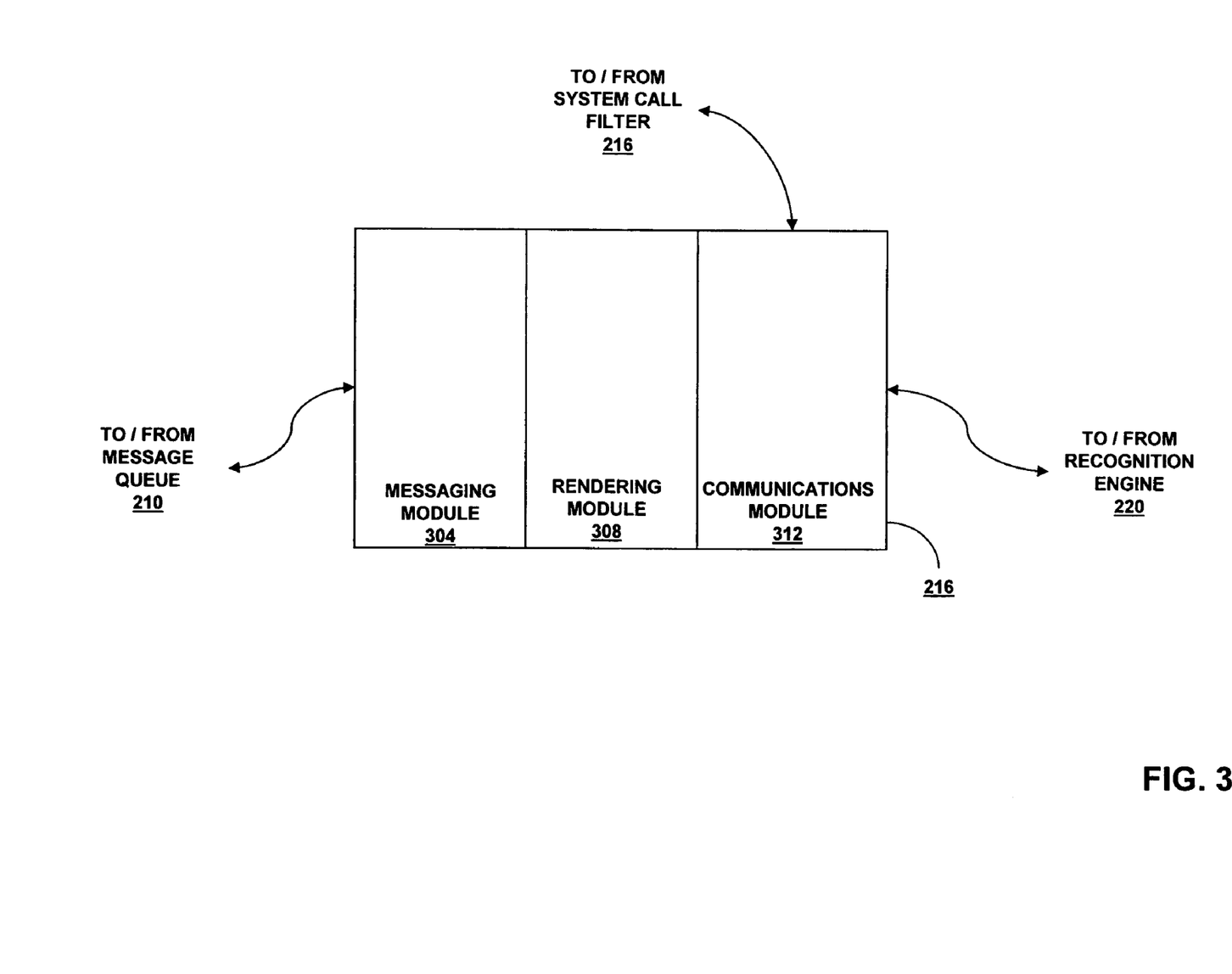
FIG. 3 is a more detailed schematic diagram of a client agent adapted to practice the methods according to one embodiment of the invention.

FIG. 3 illustrates the modules of the client agent 216 in greater detail. These include a messaging module 304, a rendering module 308, and a communications module 312. The messaging module 304 interfaces with the application message queue and monitors messages that are transmitted from the operating system to the application. It also provides the responses to the application based on the recognized screens and associated responses. The rendering module 308 receives the screen draw commands intended for the operating system from the system call filter, and based on the draw commands, creates the virtual screens. Using the communication module 312, the rendering module 308 interacts with the recognition engine to identify the rendered screen and provide the appropriate responses thereto. In some embodiments, the rendering module 308 provides additional information (e.g., new or modified parameters) based on previously recognized screens or user-provided information.

The client agent 216 can reside on the computer responsible for providing and managing user sessions with the secure system. For example, this can be the user's workstation if the user is connected to a LAN or working offline. With a remote setup, for example, a VPN connection provides a secure network access and the agent 216 runs on the client. In other embodiments such as server-based computing in which the session is provided by a CITRIX server or via Remote Terminal Services, the agent runs within each virtual session on the server.

Figure 4:
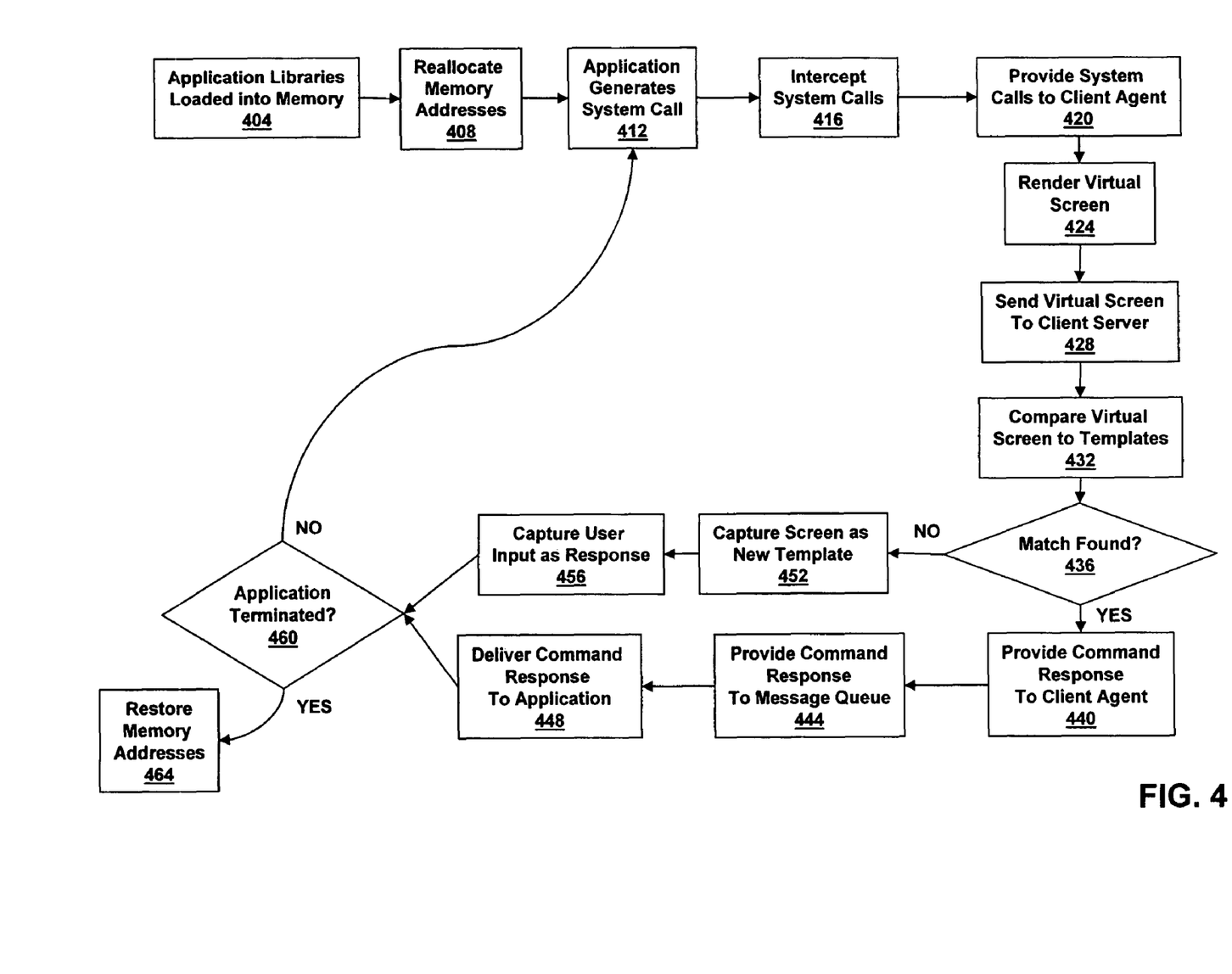
FIG. 4 is a flow diagram illustrating the process for providing automated responses to software applications according to one embodiment of the present invention.

FIG. 4 illustrates an exemplary technique for providing responses to applications in accordance with the invention. A user operating a client machine selects an application, and based on the initial selection of the application, the application and its libraries are loaded into the memory of the client (STEP 404) using, for example, an application loader. The memory locations of the libraries are stored in a table (referred to as a "jump table" in a WINDOWS 2000 system) such that when the application sends commands to one of the libraries, the application refers to the jump table to determine the appropriate memory address to send the command. In accordance with the invention, however, the memory addresses of the client machine are reallocated (STEP 408) such that the memory addresses initially assigned to the application libraries (and, in some cases, operating system functions) are reassigned to the system call filter 216 (see FIG. 2). In some cases, the libraries can be temporarily allocated to new memory addresses.

While operating, the application generates system calls (STEP 412) to instruct the operating system to perform various functions, such as to draw a screen and render it on the client display for presentation to the user. However, because the system call filter is assigned the memory address the application attributes to the libraries or procedures used to execute the commands, the commands never reach the operating system and are instead intercepted (STEP 416) by the filter. The filter determines which commands are directed to procedures that effectuate screen events and that may require user input for further processing. Examples of such screen events include the completion of text boxes, clicking of buttons, selections from drop-down boxes ("combo-boxes"), menu selections, selection of URLs, selection of media elements, and the like. The intercepted calls determined to be related to screen events are then provided to the client agent (STEP 420).

By emulating the operating system procedures and/or application libraries to which the application sends commands, the client agent renders virtual screens (STEP 424) based on the intercepted commands and any parameters that may be included with or in the commands. The screens can be rendered based on object-specific commands (e.g., windows objects that comprise screen-based images such as buttons, fields, text, etc.) or based on scrolling commands for cursor-based screens. For example, a cursor-based screen may not utilize discrete screens that appear and disappear on a user display, but instead the display is rendered line-by-line as a user provides input in response to a cursor. To capture such screens, the intercepted commands can be grouped by counting of carriage returns (e.g., every twenty carriage returns equals one screen) or time (e.g., a snapshot is taken every n seconds) to represent a screen. Once a virtual screen is compiled, the data representing that screen is sent to the recognition engine (STEP 428) where it is compared (STEP 432) to screen templates stored, for example, in the template database.

The virtual screens can be compared to the screen templates based on one or more attributes of the screens, such as element naming conventions, geometric shapes, physical layouts, images included within the screens, the ordering of the screens within the application (e.g., if SCREEN_XYZ was recognized previously, SCREEN_ABC is the next screen) as well as parameters supplied with the screens. If a match is found (DECISION STEP 436), the appropriate response (or responses) associated with that screen (and in some cases the screen/parameter combination) are identified (by querying a data storage device, for example) and provided to the client agent (STEP 440). The client agent then forwards the responses to the application message queue (STEP 444) where the application expects to find responses based on the originally issued commands. The responses are delivered to the application (STEP 448), and the application continues to operate as intended. For example, once the user authentication steps are completed, the user is presented with a screen in which they can begin to interact with the application on an ad hoc basis.

If the screen is not recognized (because, for example, the application is a new application or the screen is encountered infrequently), the recognition engine captures the various attributes of the screen (similar to those discussed above with respect to the comparison step) and stores the screen attributes as a new template (STEP 452). If user inputs are identified in response to the newly captured screen, the inputs can also be stored in the template database as potential responses (STEP 456), and thus can be automatically supplied when the screen is next encountered. The process can continue to intercept commands and automatically provide appropriate responses until the system no longer recognizes a screen and user input is required, or the application is terminated (STEP 460). Once the application is terminated, or the system is disabled because the automatic response feature is no longer needed (e.g., after the user has logged into all necessary systems and any administrative screens have been passed), the memory address values are restored (STEP 464) to their original values and the intercept filter is removed from the jump table listing. The applications then operate as they would under normal conditions.

While the invention has been particularly shown and described with reference to specific embodiments, it should be understood by those skilled in the area that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

One the system has successfully "hooked" the various modules, the system filter begins intercepting application calls using, for example, a wrapper function. For location-based draw commands, the XY position, the surface handle, and any displayed text is obtained. In some embodiments, this information may be checked to see if the surface is actually visible or is an off-screen bitmap (not visible) that are painted by the application and then copied to the display, such that a user does not see the individual characters being drawn. In some cases, scrolling information and rectangular draw operations that may or may not overwrite data previously painted are also captured. In the example below, the TextOutA, TextOutW commands are identified, ordered and stored into indexed buffers for retrieval when the drawing stops.

What is claimed is:

1. A method for providing a response, without user interactivity, to a software program executed by a processor, the method comprising:
   providing a plurality of template screen images;
   monitoring system commands issued by a software program during processor execution thereof;
   intercepting system commands relating to an application event and comprising one or more screen-rendering commands;
   generating a virtual screen image based on the intercepted screen-rendering commands;
   identifying a template screen image that matches the generated virtual screen image; and
   providing, to the executing software program, responses attributed to the identified matching screen template as if the screen-rendering commands had been executed and user input obtained in response thereto.

2. The method of claim 1 wherein the software program issues system commands to a procedure assigned to a first memory address on a client computer and further comprising reassigning memory allocations on the client computer such that the procedure is allocated to a second memory address of the client computer.

3. The method of claim 2 wherein the procedure comprises an operating system procedure.

4. The method of claim 2 wherein the procedure comprises an application procedure.

5. The method of claim 2 wherein the first memory address refers to a memory address in random access memory.

6. The method of claim 2 wherein the reassigning step occurs prior to the issuance of a command from the software program.

7. The method of claim 1 wherein a response to the software program is provided by inserting the response into a message queue.

8. The method of claim 1 wherein the intercepted commands comprise one or more parameters.

9. The method of claim 8 further comprising modifying at least one of the one or more parameters.

10. The method of claim 1 wherein the system commands comprise screen draw commands.

11. The method of claim 1 wherein the responses comprise user authentication information.

12. The method of claim 1 wherein the responses comprise transaction response information.

13. The method of claim 1 wherein the software program resides on a server.

14. The method of claim 13 wherein the software program issues system commands to a procedure assigned to a memory address on a client computer and the client and the server are in communications over a network.

15. The method of claim 14 wherein the network comprises one or more of a local area network, a wide area network, the Internet, and a virtual private network.

16. The method of claim 13 wherein the client computer comprises a remote access server.

17. A non-transitory computer-readable medium comprising computer-readable instructions for:
   providing a plurality of template screen images;
   monitoring system commands issued by a software program during processor execution thereof;

intercepting system commands relating to an application event and comprising one or more screen-rendering commands;

generating a virtual screen image based on the intercepted screen-rendering commands;

identifying a template screen image that matches the generated virtual screen image; and providing, to the executing software program, responses attributed to the identified matching screen template as if the screen-rendering commands had been executed and user input obtained in response thereto.

18. A system for providing a response to a software program, the system comprising:

a processor;

a template database for storing a plurality of template screen images;

a system call filter, executable by the processor, for (i) monitoring system commands issued by a software program during processor execution thereof, (ii) intercepting system commands relating to an application event, the commands comprising one or more screen-rendering commands, and (iii) generating a virtual screen image based on the intercepted screen-rendering commands;

a recognition engine, executable by the processor, for recognizing the screen-rendering commands and identifying a template screen image that matches a screen corresponding to the screen-rendering commands; and a client agent for providing, to the executing software program, responses attributed to the identified matching screen template as if the screen-rendering commands had been executed and user input obtained in response thereto.

19. The system of claim 18 further comprising a template database for storing a plurality of templates, each template representing one or more screen images.

* * * * *